Patented Jan. 16, 1951

2,538,260

UNITED STATES PATENT OFFICE 2,538,260

DIACETYL AS SHORTSTOP IN BUTADIENE-1,3 EMULSION POLYMERIZATION

William E. Messer, Cheshire, and James A. Reynolds, Naugatuck, Conn., assignors to United States Rubber Company, New York, N. Y., a corporation of New Jersey No Drawing. Application August 6, 1947, Serial No. 766,865

3 Claims. (Cl. 260—83.7)

This invention relates to improvements in stoppers of the polymerization of polymerizable monomers in the preparation of synthetic rubber latex.

It is known to produce synthetic rubber latices by the aqueous emulsion polymerization of butadienes-1,3 and mixtures of butadienes-1,3 with copolymerizable material, such as styrene and acrylonitrile, at elevated pressure in the presence of an oxidizing catalyst, and before complete conversion of monomers to synthetic rubber stopping the polymerization by addition of a so-called stopper, after which unreacted monomers may be removed and the synthetic rubber recovered from the latex by conventional means, such as flocculation, washing, filtering and drying. This stopping of the polymerization short of completion gives synthetic rubber products with better physical properties than where the emulsion-polymerization is allowed to go to complete conversion. After the desired polymerization, some or all of the unreacted monomers that are gaseous at atmospheric pressure are usually vented off as a gas upon reduction of the pressure to atmospheric pressure, and the higher boiling point monomers are then removed by steam or vacuum distillation. Hydroquinone has been used as a stopper but this material is expensive and discolors the latex and the synthetic rubber product. Sodium sulfide is an inexpensive and nondiscoloring stopper, but the hydrogen sulfide liberated has a bad odor, and causes very damaging corrosion to plan equipment.

We have found that diacetyl is an effective stopper in the preparation of synthetic rubber latex. It is inexpensive, nondiscoloring and noncorrosive.

The amount of diacetyl to stop the polymerization reaction is not critical, generally .05 to 1 part by weight of diacetyl per 100 parts by weight of polymerizable material originally present in the emulsion will be used, although smaller or larger amounts may be employed. The diacetyl may be added to the aqueous emulsion polymerizate after any desired degree of conversion. Generally this will be after conversion of 70 to 95% of polymerizable monomers originally present to synthetic rubber, depending on the particular monomers and the physical properties desired in the final synthetic rubber product. The diacetyl is preferably added to the synthetic rubber latex to stop further polymerization before removal of any unreacted monomers. However, if the synthetic rubber latex is prepared from mixtures of low boiling monomers, such as butadiene, and high boiling monomers, such as styrene, the butadiene may be vented from the reactor by reducing the pressure to atmospheric pressure before addition of the diacetyl, after which addition, the high boiling monomers, such as styrene, may be recovered by conventional steam or vacuum distillation. The recovered unreacted monomers may be reused in subsequent latex preparation. In removal of such styrene by steam or vacuum distillation, some of the diacetyl may be removed with the styrene. If excessive amounts of such diacetyl should accumulate in the recovered styrene after many cycles, so that it cannot readily be used again in the preparation of synthetic rubber latex, the diacetyl may readily be removed from the styrene by water extraction. The dione nucleus does not appear to be involved in the stopping ability of the diacetyl since benzil and glyoxol were not effective stoppers.

The polymerizable material for the preparation of the synthetic rubber latex may be one or more butadienes-1,3, for example, butadiene-1,3, 2-methyl-butadiene-1,3 (isoprene), 2-chloro-butadiene-1,3 (chloroprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more compounds which contain a

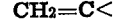

group where at least one of the disconnected valences is attached to an electro-negative group, that is, a group which substantially increases the electrical dissymmetry or polar character of the molecule, such group being other than H or $CH_3$. Examples of compounds which contain a $CH_2=C<$ group and are copolymerizable with butadiene-1,3 hydrocarbons are aryl olefines, such as styrene and vinyl naphthylene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

The oxidizing catalyst used in the preparation of such synthetic rubber latices are the conventional peroxygen type catalyst, such as persalts, e. g. alkali persulfates, alkali perborates, alkali percarbonates; hydrogen peroxide; or organic peroxides, e. g. acyl peroxides, such as diacetyl peroxide, dibenzoyl peroxide, acetyl benzoyl peroxide, and alkyl peroxides, such as tertiary butyl hydroperoxide. The persalts and hydrogen peroxide are preferred with polymerization in aqueous emulsions as in the present case.

The following example is given in illustration of the invention, the parts referred to therein being by weight:

Butadiene-1,3 (72 parts) and styrene (28 parts) having dissolved therein 0.5 part of dodecyl mercaptan, were emulsified in a solution of 5 parts of ordinary soap (sodium salt of a mixture of stearic, oleic and palmitic acids) and 0.3 part of potassium persulfate in 180 parts of water. The dodecyl mercaptan is a common polymerization regulator, aliphatic mercaptans having 6 to 18 carbon atoms and aromatic mercaptans being conventional. The ratio of water to polymerizable monomers in the emulsion is generally 1 to 3 times the weight of polymerizable monomers in the emulsion. This emulsion was gently agitated and heated for sixteen hours at about 45° C. in a closed vessel to copolymerize the butadiene-1,3 and styrene. A sample of the material was analyzed and showed 32.5% total solids content. The synthetic rubber latex was further polymerized for an additional six hours at about 45° C. and to substantially complete conversion giving a product having a total solids content of 34.6%. To four similar runs polymerized for about sixteen hours at about 45° C. were added 0.05, 0.1, 0.2 and 0.5 part respectively of diacetyl after the sixteen hour polymerization period, followed by further heating at 45° C. for six to seven hours. The first latex after the sixteen hour run showed a solids content of 32.2%, and addition of the .05 part of diacetyl and further heating at 45° C. for six hours, showed a total solids content of 32.4%. The second run after the sixteen hour polymerization showed a solids content of 31.2%, and after the .1 part of diacetyl was added with further heating for six hours at 45° C., the total solids content analyzed 31.5%. In the third run, the total solids content after the sixteen hours polymerization was 31.2%. After addition of .2 part of diacetyl and six hours additional heating at 45° C., the solids content analyzed 31.4%. In the last run, after the sixteen hour polymerization and addition of the .5 part of diacetyl and heating at 45° C. for seven hours, the solids content analyzed 30.1%. The diacetyl thus stopped the polymerization in these last four runs. There was no discoloration of the latices where the .05 and .1 part of diacetyl had been added. There was a very slight hue where .2 part diacetyl was added and a pinkish cast where the .5 part of diacetyl was added.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. In the preparation of a synthetic rubber latex by the polymerization of an aqueous emulsion of material selected from the group consisting of butadienes-1,3 and mixtures of butadienes-1,3 with compounds which are copolymerizable therewith, the step of adding to the emulsion .05 to 1 part by weight of diacetyl per 100 parts of polymerizable material originally present in the emulsion after polymerization of 70 to 95% of the polymerizable material originally present in the emulsion to synthetic rubber and while said emulsion contains unreacted polymerizable monomeric material.

2. The method of preparing a synthetic rubber latex which comprises subjecting an aqueous emulsion of material selected from the group consisting of butadienes-1,3 and mixtures of butadienes-1,3 with compounds which contain a $CH_2=C<$ group and are copolymerizable with butadienes-1,3 to polymerization in the presence of an oxidizing catalyst, and on conversion of 70 to 95% of the polymerizable monomers originally present to polymerized material adding to the emulsion polymerizate .05 to 1 part by weight of diacetyl per 100 parts of polymerizable material originally present in the emulsion to stop polymerization of unreacted polymerizable monomers.

3. The method of preparing a synthetic rubber latex which comprises subjecting an aqueous emulsion containing butadiene-1,3 and styrene to polymerization in the presence of an oxidizing catalyst, and on conversion of 70 to 95% of the polymerizable monomers originally present to polymerized material adding to the emulsion polymerizate .05 to 1 part by weight of diacetyl per 100 parts of polymerizable material originally present in the emulsion to stop polymerization of unreacted polymerizable monomers.

WILLIAM E. MESSER.
JAMES A. REYNOLDS.

REFERENCES CITED

The following references are of record in the file of this patent:

FOREIGN PATENTS

| Number | Country | Date |
|---|---|---|
| 567,777 | Great Britain | Mar. 2, 1945 |

OTHER REFERENCES

Starkweather et al.: Ind. Eng. Chem. 39, 218 (Feb. 1947).